(12) United States Patent
Righettini

(10) Patent No.: US 6,562,181 B2
(45) Date of Patent: *May 13, 2003

(54) REACTIVE ADHESIVES AND COATINGS WITH TRIFUNCTIONAL OLEFINIC MONOMERS

(75) Inventor: Robin F. Righettini, Apex, NC (US)

(73) Assignee: Lord Corporation, Cary, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,489

(22) Filed: Jun. 11, 1999

(65) Prior Publication Data

US 2002/0129896 A1 Sep. 19, 2002

(51) Int. Cl.$^7$ ............................................. B32B 31/00
(52) U.S. Cl. ..................... 156/331.6; 526/298; 526/299
(58) Field of Search ....................... 156/331.6; 526/298, 526/299

(56) References Cited

U.S. PATENT DOCUMENTS

| | | | |
|---|---|---|---|
| 2,748,050 A | * | 5/1956 | Shearer et al. ............... 156/334 |
| 2,981,650 A | | 4/1961 | Bäder et al. |
| 3,092,611 A | * | 6/1963 | Lynn .......................... 526/298 |
| 4,158,647 A | * | 6/1979 | Azorlosa ..................... 526/304 |
| 4,313,865 A | | 2/1982 | Toshio et al. |
| 5,318,852 A | * | 6/1994 | Nishimori et al. .......... 526/298 |
| 6,096,848 A | * | 8/2000 | Gololobov et al. .......... 526/298 |

FOREIGN PATENT DOCUMENTS

| | | |
|---|---|---|
| DE | 276985 | 3/1990 |
| JP | 56 043377 | 4/1981 |
| WO | 98/30645 | 7/1998 |

OTHER PUBLICATIONS

"Bond–Forming Initiation in Spontaneous Addition and Polymerization Reactions Of Alkenes". H.K. Hall, Jr. *Angewandte Chemie*. vol. 22, No. 6, Jun. 1983.

"Novel Copolymers of Trisubstituted Ethylenes with Styrene. II. Halogen Ring–Substituted Methyl 2–Cyano–3–Phenyl–2–Propenoates" Gregory B. Kharas, et al. *Macromolecular Reports* A32(Suppl. 4), 405–414 (1995).

"New Copolymers of Styrene with Some Trisubstituted Ethylenes" G.B. Kharas and C.B. Feinberg. *Polymer Preprints*. 29(1), 180(1988).

"New Copolymers from Electrophilic Trisubstituted Ethylenes and Electron–rich Vinyl Comonomers" H.K. Hall and R.F. Righettini. *Polymer Bulletin* 16, 405–409 (1986).

"Synthesis and Copolymerization of New Trisubstituted Ethylenes" G.B. Kharas and C.J. Petit. *Polymer Preprints* 30(1), 257 (1989).

"Effect of Substituents on the Radical Copolymerization of Ring–Substituted Methyl 2–Cyano–3 Phenyl–2–Propenoates with Styrene" Gregory B. Kharas, et al. *J.M.S.—Pure Appl. Chem*, A34(4), pp. 627–640 (1997).

"Copolymerization of Styrene. IV. Copolymerization with Esters of Benzylidenecyanoacetic Acid" Arie Gilath, et al. *Journal of Applied Polymer Science*. vol. 14, pp. 1491–1505 (1970).

* cited by examiner

*Primary Examiner*—Jeff H. Aftergut
(74) *Attorney, Agent, or Firm*—Miles B. Dearth

(57) ABSTRACT

A method for bonding together two substrates that includes applying to a first substrate an adhesive composition that includes (a) a trifunctional olefinic first monomer, (b) an olefinic second monomer that is copolymerizable with the first monomer and (c) a free radical initiator and then contacting a second substrate to the composition-applied first substrate so that the first and second substrate adhesively bond together. There is also provided a method for providing a coating on a substrate that includes applying to the substrate a composition that includes (a) a trifunctional olefinic first monomer, (b) an olefinic second monomer that is copolymerizable with the first monomer and (c) a free radical initiator and then allowing the composition to cure. Preferably, the adhesive or coating composition includes (a) a free radical polymerizable monomer component that includes a trifunctional olefinic first monomer and an olefinic second monomer that is copolymerizable with the first monomer and (b) a redox initiator system, wherein the adhesive composition is a liquid at room temperature and is curable at room temperature.

40 Claims, No Drawings

REACTIVE ADHESIVES AND COATINGS WITH TRIFUNCTIONAL OLEFINIC MONOMERS

BACKGROUND OF THE INVENTION

The invention relates to adhesives and coatings that include a free radical polymerizable component wherein the free radical polymerizable component includes a trifunctional olefinic monomer.

Reactive acrylic adhesives that cure by free radical polymerization of (meth)acrylic esters (i.e., acrylates) are known, but suffer from certain drawbacks. Commercially important acrylic adhesives tend to have an offensive odor, particularly those that are made from methyl methacrylate. Methyl methacrylate-based acrylic adhesives also have low flash points (approximately 59° F.). Low flash points are particularly an issue during storage and transportation of the adhesives. If the flash point is 141° F. or lower, the U.S. Department of Transportation classifies the product as "Flammable" and requires marking and special storage and transportation conditions.

Another problem with reactive, two-part, acrylic adhesives utilizing a benzoyl peroxide/tertiary amine free radical initiator system is that the volume mix ratio of one part with the other part is not 1:1—it is typically 4:1 or 10:1. Obviously, this requires more careful measurement calculation during application of the adhesive and causes packaging problems. The mix ratio problem results largely from the instability of mixtures of free radical initiators such as benzoyl peroxide with (meth)acrylic monomers at room temperature. The free radical initiators generate a sufficient amount of free radical to gel the monomers over a short time period.

Styrenic monomers such as styrene and vinyl toluene have been suggested as alternatives to (meth)acrylic adhesives (see, e.g., U.S. Pat. No. 2,981,650), but these have at least two drawbacks. The film formed from styrenic monomers is too brittle and the cure rate of styrenic monomers is too slow to be useful as a structural adhesive.

A two part reactive adhesive with reduced odor and flammability that could be mixed at a 1:1 volume ratio without comprising shelf life stability or adhesive performance would be very desirable.

SUMMARY OF THE INVENTION

The composition of the invention is a reactive adhesive or coating that includes two parts or sides that are mixed together at the time of use. The reaction of the two parts acts to cure the adhesive or coating. It has been discovered that a certain copolymerization system provides a reactive adhesive or coating composition that has very useful characteristics.

In particular, a trifunctional olefinic first monomer and an olefinic second monomer copolymerize when mixed together with a free radical initiator system. If the initiator and monomer mixture is applied to a substrate, the copolymerization process acts to form a highly crosslinked composition that is strongly adhesively bonded to the substrate.

Thus, according to a first embodiment of the invention there is provided a method for bonding together two substrates that includes applying to a first substrate an adhesive composition that includes (a) a trifunctional olefinic first monomer, (b) an olefinic second monomer that is copolymerizable with the first monomer and (c) a free radical initiator and then contacting a second substrate to the composition-applied first substrate so that the first and second substrate adhesively bond together.

According to a second embodiment of the invention there is provided a method for providing a coating on a substrate that includes applying to the substrate a composition that includes (a) a trifunctional olefinic first monomer, (b) an olefinic second monomer that is copolymerizable with the first monomer and (c) a free radical initiator and then allowing the composition to cure.

According to a further embodiment of the invention there is provided a bonded assembly that includes a first substrate, a second substrate and an adhesive composition between the first and second substrates wherein the adhesive composition is the cured product of a reaction mixture comprising (a) a trifunctional olefinic first monomer, (b) an olefinic second monomer that is copolymerizable with the first monomer and (c) a free radical initiator.

According to another embodiment of the invention there is provided an adhesive composition comprising (a) a free radical polymerizable monomer component that includes a trifunctional olefinic first monomer and an olefinic second monomer that is copolymerizable with the first monomer and (b) a redox initiator system, wherein the adhesive composition is a liquid at room temperature and is curable at room temperature.

One advantage of trifunctional olefinic monomers is that they do not homopolymerize in the presence of a free radical initiator. Thus, in a two-part reactive composition the trifunctional olefinic monomer can be included in the same part as the free radical initiator. This more easily allows for the formulation of 1:1 equal mix ratio between the two parts since the trifunctional olefinic monomer can be used as a reactive diluent for the initiator-containing part thus allowing adjustability of the volume and mole ratio relative to the other part. Additional advantages of the reactive adhesive system according to the invention is lower odor and lower flammability, particularly a flash point of 141° F. or higher. A further advantage is that certain trifunctional olefinic monomer/copolymerizable olefinic monomer systems exhibit low viscosity allowing for compounding with inexpensive fillers. In addition, the reactivity of the trifunctional olefinic monomers with stryenic monomers allows for commercially practical use of styrenic monomers in adhesives.

DETAILED DESCRIPTION OF THE PREFERRED EMBODIMENTS

Unless otherwise indicated, description of components in chemical nomenclature refers to the components at the time of addition to any combination specified in the description, but does not necessarily preclude chemical interactions among the components of a mixture once mixed.

As used herein, the following terms have certain meanings.

"Flash point" is the temperature at which a substance evolves sufficient flammable vapor to give a visible flash on the introduction of a spark or a small flame.

"Room temperature" means ambient workplace (manufacturing or assembly plant, laboratory, etc.) temperature range, typically 10–40° C., more typically 20–30° C.

The trifunctional olefinic monomers are monomers that include olefinic or ethylenic unsaturation and at least three functional groups that are each bonded directly to the unsaturated carbon atoms. As used in the context of "trifunctional", "functional group" includes alkyl as well as the various functional groups conventionally referred to in the organic chemical art. The trifunctional olefinic monomers are electrophilic.

Useful trifunctional olefinic monomers typically have a generic structure represented by formula A

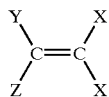

wherein each X is the same or different and is an electron withdrawing group such as —$SO_2R^1$, —CN, $SO_2Ar$, —(C=O)$R^2$, or halogen (wherein $R^1$ is alkyl, alkoxy, alkyl ether, amino, alkylamino, alkylimino, or alkylamimidoyl; Ar is an aryl or substituted aryl group; $R^2$ is $R^1$, —$OR^1$, —N(H)$R^1$, or —$NH_2$); Y is —$R^1$, —Ar or an electron withdrawing group as identified for X; and Z is a moiety selected from the first or second row elements of the Periodic Chart in the form of either a single element (such as —H or —F) or linearly bonded multiple elements (such as —CN). The two X groups or the X and Y groups also could form a fused ring system such as a lactone, anhydride or imide. Both unsaturated carbon atoms of the trifunctional olefinic monomer are sterically hindered by the functional groups. Preferably, X is —CN or —$COOR^1$; Y is —CN, —$COOR^1$ or —Ar; Z is hydrogen; and $R^1$ is a primary or secondary linear or branched alkyl having 1 to 18 carbon atoms. "Primary" alkyl means that the carbon atom of $R^1$ bonded to —OOC— is also bonded to only one non-hydrogen atom (thus, it is bonded to two hydrogen atoms). "Secondary" alkyl means that the carbon atom of $R^1$ bonded to —OOC— is also bonded to two non-hydrogen atoms (thus, it is bonded to only one hydrogen atom).

Illustrative trifunctional olefinic monomers include arylidenecyanoacetates such as benzylidenecyanoacetate (i.e., ester of benzylidenecyanoacetic acid); arylidenecyanoacetamides; alkylidenecyanoacetates such as ethylidenecyanoacetate; arylideneacetoacetates such as benzylidineacetoacetate; substituted fumarate esters such as di(cyano)fumarate ester, cyanofumarate esters and bromofumarate esters; di(cyano)acrylates such as ethyl 2,3-di(cyano)acrylate or methyl 1,1-di(cyano)-2-carboxyethene; tricarboalkoxyethenes; tri(cyano)ethylenes; carboxyalkylmaleic anhydrides; esters of di(cyano)fumaric acid; esters of tri(cyano)acrylic acid; esters of β-halocyanoacrylic acids; esters of 2-halo-2-cyanoacrylic acid; α-carboalkoxy-N-phenyl maleimide; and α-(phenylsulfonyl)maleic anhydride.

Benzylidenecyanoacetates having a generic structure represented below by formula B are particularly preferred.

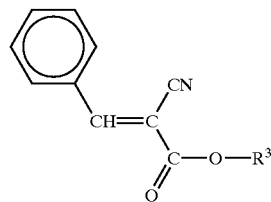

wherein $R^3$ is a linear or branched alkyl, alkoxy, alkyl ether, amino, alkylamino, alkylamino, or alkylamimidoyl. Preferably, $R^3$ is an alkyl or alkyl ether, particularly one having 1 to 18 carbon atoms. Methyl, ethyl, n-butyl, n-hexyl, 2-ethylhexyl, n-propyl, isopropyl, allyl, iso-octyl, 2-methoxyethyl, 2-ethoxyethyl, 2-methoxy-2-propyl and 2-ethoxy-2-propyl are particularly preferred for $R^3$. Benzylidenecyanoacetates are identified herein according to the $R^3$ group. Thus, if $R^3$ is methyl then the benzylidenecyanoacetate is referred to as "methyl benzylidenecyanoacetate".

Especially useful in the present invention are benzylidenecyanoacetates wherein $R^3$ is a secondary alkyl or secondary alkyl ether. In other words, the carbon atom of $R^3$ bonded to —OOC— is also bonded to two non-hydrogen atoms (meaning that it is bonded to only one hydrogen atom) as represented by formula C shown below.

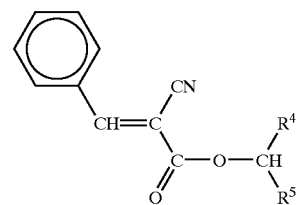

wherein each of $R^4$ and $R^5$ is the same or different and is selected from alkyl, alkoxy or alkyl ether. Preferably, $R^4$ and $R^5$ are different and each have 1 to 10 carbon atoms and more preferably are methyl, ethyl, propyl, methoxy, hexyl, ethoxy, butyl, pentyl and branched alkyl groups.

Certain secondary benzylidenecyanoacetates such as ±1-methoxy-2-propyl benzylidenecyanoacetate and ±2-octyl benzylidenecyanoacetate are particularly preferred because it has been found that they exist as liquids at room temperature.

Trifunctional olefinic monomers that are liquid at room temperature are preferred. Solid or waxy benzylidenecyanoacetates, however, can be used by dissolving or dispersing them in a reactive diluent, the copolymerizable second olefinic monomer or a solvent.

Arylidenecyanoacetates, alkylidenecyanoacetates and arylideneacetoacetates can be made via catalyzed Knoevenagel condensation of aldehydes with cyanoacetates or acetoacetates as described in Gilath et al, *J. Appl. Poly Sci.*, 14, 1491 (1970). This condensation reaction typically is performed in a conventional solvent such as hexane, cyclohexane, heptane, octane, benzene, toluene, xylene, ethanol and propanol. The catalyst usually is a base capable of removing a proton from the cyanoacetate. Examples include piperidine, a mixture of piperidine with acetic acid, pyridine, diethyl amine, propyl amine, potassium hydroxide, triethyl amine and butyl lithium. The reaction temperature typically is controlled by the boiling point of the solvent. Water is evolved in this reaction, and it may or may not be removed by distillation. The exotherm, if any, can be controlled by the slow addition of one of the reactants.

Second monomers particularly useful for copolymerization with the trifunctional olefinic monomers are those that include olefinic or ethylenic unsaturation. Such monomers tend to be electron-donating. Copolymerizable olefinic monomers are represented by the generic structure shown below as formula D:

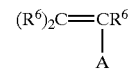

wherein A is aryl, substituted aryl, alkyl, alkenyl, alkoxy, alkenyloxy, alkadienyl or acetoxy and each $R^6$ is the same or different and is selected from hydrogen or alkyl. Preferably, A is aryl or substituted aryl and $R^6$ is hydrogen.

Illustrative olefinic monomers include styrenic monomers; vinyl ethers; vinyl esters such as vinyl acetate; n-vinylcarbazole; diene monomers such as 2,3-dichloro-1,3-butadiene, 1,3-cyclohexadiene, myrcene and 2-chloro-1,3-butadiene. "Styrenic monomer" means styrene per se and styrenes substituted with additional functional groups. Illustrative styrenic monomers include styrene, 2-vinyl toluene, 3-vinyl toluene, 4-vinyl toluene, p-acetoxy styrene, chloromethyl styrene, ethyl styrene, divinyl benzene, 2-fluorostyrene, 3-fluorostyrene, 4-fluorostyrene, 2-chlorostyrene, 3-chlorostyrene, 4-chlorostyrene, 2-bromostyrene, 3-bromostyrene, 4-bromostyrene, 2,3,4,5,6-pentafluorostyrene, 4-vinyl benzoic acid, esters of 4-vinyl benzoic acid, 9-vinylanthracene, 4-methoxystyrene, 4-ethoxystyrene, 4-vinylbiphenyl, 2,4-dimethylstyrene, 4-vinylaniline, 4-cyanostyrene and glycidyl vinylbenzyl ether. Styrene, 2-vinyl toluene, 3-vinyl toluene and 4-vinyl toluene are preferred. Vinyl toluene is preferred (particularly 3-vinyl toluene, 4-vinyl toluene and mixtures thereof) because it has a higher flash point and less odor compared to styrene. As mentioned above, an important advantage of the invention is that the favorable copolymerization rate of the trifunctional olefinic monomers with styrenic monomers now allows for their use in adhesives.

The trifunctional olefinic monomer and the second olefinic monomer can be present in any amount effective to react together. Generally, the mole ratio of the trifunctional olefinic monomer to the second olefinic monomer may be 0.05 to 1.2, preferably 0.2 to 1.0.

The composition of the invention can include an optional third monomer that is copolymerizable with the second olefinic monomer and the trifunctional olefinic compound. The optional third monomer typically is also an olefinically or ethylenically unsaturated monomer but it has less than three functional groups bonded directly to an unsaturated carbon atom. Illustrative third monomer classes include maleate esters (ROOC)CH=CH(COOR) and corresponding half-esters; fumarate esters (i.e., trans-isomer of maleate ester) and corresponding half-esters; and (meth)acrylic acids and their esters. The optional third co-monomer can be present in amount of 0 to 80, preferably 1 to 30 weight percent, based on the total weight of the part of the adhesive composition that does not include an oxidizing agent. The optional third monomer could provide greater control of polymer flexibility, wetting, hydrophobicity and surface characteristics and might reduce the cost of the system.

The trifunctional olefinic monomer and second olefinic monomer react together resulting in a reaction product that includes an idealized polymer having a backbone structure represented by formula E below.

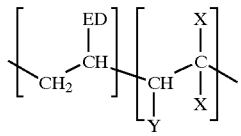

wherein X and Y are the same as in formula A and ED is the residual moiety from the second copolymerizable monomer. For example, if styrene is the second copolymerizable monomer, ED is a phenyl group.

The polymer of formula E can be a substantially equimolar 1:1 alternating copolymer, but preferably an excess of the second copolymerizable monomer is reacted with the trifunctional olefinic monomer to provide a copolymer with an alternating structure that is distributed over a certain range such as a composition that includes a mixture of polymer chains forming a gradient of structures from 1:1 alternating copolymer to the homopolymer of styrene.

Of course, when the trifunctional olefinic monomer and the copolymerizable olefinic monomer are included in a multi-component adhesive or coating composition with other reactive components the resulting reaction product is much more complex. The resulting reaction product (i.e., the cured adhesive or coating) will include a certain molecular distribution of polymers having the idealized copolymer backbone structure of formula E, and branched and crosslinked polymers that will include the backbone structure of formula E and moieties and chains from the other reactive components. For example, as described below, reactive toughening agents or polymers are often formulated into the composition. These toughening agents and polymers also react with the trifunctional olefinic monomers, the copolymerizable monomers, and the resulting copolymer to form a highly branched and crosslinked structure.

The copolymerization of the trifunctional olefinic monomer and the second olefinic monomer typically occurs via a free radical mechanism at room temperature. The free radical mechanism can be any system capable of generating a free radical such as a thermal systems, redox systems and photoinitiation systems. Examples of thermal free radical initiators include azobisisobutyronitrile, 2,2'-azobis-(2,4-dimethyl valeronitrile), 2,2'-azobis (methyl isobutyrate), benzoyl peroxide, acetyl peroxide, cumyl peroxide, t-butyl peroxide, t-butyl hydroperoxide, cumyl hydroperoxide, and t-butyl perbenzoate. Examples of photoinitiation systems include benzophenone, acetophenone, benzoin, benzoin ethers, benzil and benzil ketals. The preferred free radical initiator is a redox system as explained below in more detail.

As described above, the polymerizable combination finds particular usefulness in an adhesive composition wherein curing of the adhesive composition occurs via the above-described free radical systems. The adhesive composition can be a one part composition that is cured by thermal free radical initiation or photoinitiation or it can be a two part adhesive composition that is cured by the mixture of a redox free radical initiator system.

The compositions of the invention preferably are substantially 100% reactive. In other words, all components of the adhesive react during curing and thus there is no volatilization of organic compounds. Preferably or alternatively, the adhesive is substantially free of volatile organic compounds as solvents (less than one weight percent, based on the total amount of the adhesive composition. Such adhesive compositions are also known as 100% solids. As explained below, reactive diluents are used rather than volatile solvents.

Compositions that include the trifunctional olefinic monomer and the copolymerizable olefinic monomer can include a diluent that is reactive with the other components of the adhesive, particularly the trifunctional olefinic monomer and the copolymerizable olefinic monomer. Reaction of the reactive diluent also contributes to the curing of the adhesive, provides adhesive strength and aids in wetting. The diluent can be a monomer selected from those listed above for the second olefinic monomer and thus can serve a dual function. Particularly useful reactive diluents are the styrenic monomers.

The compositions can also include at least one polymeric material, preferably an elastomer, which can act as a toughening agent. The polymeric material may or may not include an ethylenically unsaturated structure that is capable of reacting with at least one of the ethylenically unsaturated monomers described above. The polymeric material can be, for example, polychloroprene as described in U.S. Pat. No. 2,981,650; a polymer-in-monomer syrup as described in U.S. Pat. Nos. 3,725,504 and 4,223,115; butadiene-based elastomers and urethane-modified butadiene-based elastomers as described in U.S. Pat. Nos. 4,223,115; 4,452,944; 4,769,419 and 5,641,834; chlorosulfonated polyethylene rubbers and/or a mixture of sulfonyl chloride with chlorinated polyethylene as described in U.S. Pat. Nos. 3,890,407, 5,206,288 and 4,536,546; and olefinic urethane reaction products of an isocyanate-functional prepolymer and a hydroxy-functional monomer as described in U.S. Pat. Nos. 4,223,115, 4,452,944, 4,467,071, and 4,769,419.

Polymer-in-monomer syrups are well known in the art. The monomer can be any of the ethylenically unsaturated monomers described above. The monomer of the polymer-in-monomer syrup can itself serve as the polymerizable component of the composition or a pre-formed polymer-in-monomer syrup can be mixed with an ethylenically unsaturated monomer. Exemplary polymer-in-monomer syrups are described in U.S. Pat. Nos. 3,725,504 and 4,223,115.

Representative liquid olefinic-terminated elastomers include homopolymers of butadiene; copolymers of butadiene and at least one monomer copolymerizable therewith, for example, styrene, acrylonitrile, methacrylonitrile; as well as modified elastomeric polymeric materials, such as butadiene homopolymers and copolymers as noted above modified by copolymerization therewith of trace amounts or up to about 5 percent by weight of the elastomeric material of at least one functional monomer (such as acrylic acid, methacrylic acid, maleic anhydride, fumaric acid, styrene and methyl methacrylate). The secondary hydroxyl group of liquid butadiene-based elastomers can be reacted with an isocyanate to form a liquid urethane-modified butadiene elastomer as described in U.S. Pat. Nos. 4,769,419 and 5,641,834.

Other useful elastomers include a homopolymer or copolymer of epichlorohydrin and ethylene oxide and copolymers of ethylene and acrylate esters, such as methyl acrylate and ethyl acrylate, wherein the copolymer contains at least 30 weight percent acrylate ester that are available from E. I. duPont under the tradename VAMAC.

The chlorosulfonated polyethylene and sulfonyl chloride/chlorinated polyethylene mixture embodiments can have a chlorine content of 25 to 67 weight percent and 3 to 160 mmols sulfonyl chloride moiety per 100 grams of polymer. Further, the polyethylene from which the chlorosulfonated polyethylene is made preferably has a melt index of 4 to 500.

An illustrative adhesive system is a room temperature-curable structural adhesive that includes (a) 5–60, preferably 10–50, weight percent of the trifunctional olefinic monomer;

(b) 10–90, preferably 30–60, weight percent of the second olefinic monomer;

(c) 0–50, preferably 10–40, weight percent of at least one elastomeric toughening agent;

(d) 0–20 weight percent of a phosphorus-containing compound having one or more olefinic groups and no less than one P—OH group; and (e) a room temperature-active initiator system that includes at least one reducing agent and at least one oxidizing agent that are co-reactive at room temperature to generate free radicals that are capable of initiating and propagating the cure of said adhesive composition, wherein the weight percents are based on the total weight of components (a)–(d).

The free radical-polymerizable adhesive compositions of the invention are normally provided as two-part or package systems, with the parts being mixed or contacted at the time of use to provide a free radical curing adhesive. As described above, an advantage of the invention is that the trifunctional olefinic compound can be included in the part with an oxidizing agent. However, the trifunctional olefinic compound does not have to be included in the part with the oxidizing agent. In more detail, these two-part systems can include (I) a first part or side comprising
  (a) 10–90, preferably 30–60, weight percent of the second olefinic monomer;
  (b) 0–50, preferably 10–40, weight percent of at least one elastomeric toughening agent;
  (c) 0–20, preferably 1–3, weight percent of a phosphorus-containing compound having one or more olefinic groups and no less than one P—OH group; and
  (d) 0.5–10, preferably 1–3, weight percent of at least one reducing agent which is interactive with a peroxide oxidizing agent to produce free radicals which are capable of initiating and propagating free radical polymerization reactions; and (II) a second part or side comprising
  (a) 1–99, preferably 10–90, weight percent, of the trifunctional olefinic monomer; and
  (b) a bonding activator containing a peroxide oxidizing agent of a room temperature-active redox couple initiator system, the peroxide oxidizing agent being reactive at room temperature with reducing agent (d) when the first and second parts are mixed to produce free radicals which are capable of initiating and propagating free radical polymerization, the amount of the peroxide oxidizing agent being sufficient to interact with reducing agent (d), wherein the weight percents of the first part are based on the total weight of components (a)–(c) and the weight percent of the second part is based on the total weight of the second part.

Phosphorus-containing compounds that enhance metal adhesion as well as slow cure rate can be any derivative of phosphinic acid, phosphonic acid or phosphoric acid having at least one P—OH group and at least one organic moiety characterized by the presence of an olefinic group, which is preferably terminally located. A listing of such phosphorus compounds is found in U.S. Pat. No. 4,223,115. A preferred phosphorus-containing compound has a structure that may be represented by the formula

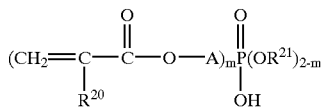

wherein $R^{20}$ is selected from the group consisting of hydrogen, an alkyl group having from one to 8, preferably one to 4, carbon atoms, and $CH^2$=CH—; $R^{21}$ is selected from the group consisting of hydrogen, an alkyl group having from one to 8, preferably one to 4 carbon atoms; A is selected from the group consisting of —$R^{22}$O— and $(R^{23}O)_n$, wherein $R^{22}$ is an aliphatic or cycloaliphatic alkylene group containing from one to 9, preferably 2 to 6, carbon atoms; $R^{23}$ is an alkylene group having from one to 7, preferably 2 to 4, carbon atoms; n is an integer from 2 to 10, and m is one or 2, preferably one.

Phosphorous-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred. Representative phosphorus-containing compounds include, without limitation, 2-hydroxyethyl methacrylate phosphate; bis-(2-methacryloyloxyethyl)phosphate; 2-acryloyloxyethyl phosphate; bis-(2-acryloyloxyethyl)phosphate; methyl-(2-methacryloyloxyethyl)phosphate; ethyl methacryloyloxyethyl phosphate; methyl acryloyloxyethyl phosphate; ethyl acryloyloxyethyl phosphate; compounds of the above formula wherein $R^8$ is hydrogen or methyl and $R^9$ is propyl, isobutyl, ethylhexyl, halopropyl, haloisobutyl or haloethylhexyl; vinyl phosphonic acid; cyclohexene-3-phosphonic acid; alpha-hydroxybutene-2 phosphonic acid; 1-hydroxy-1-phenylmethane-1,1-diphosphonic acid; 1-hydroxy-1-methyl-1-diphosphonic acid: 1-amino-1 phenyl-1,1-diphosphonic acid; 3-amino-1-hydroxypropane-1,1-diphosphonic acid; amino-tris(methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl) phosphinic acid and allyl methacryloyloxyethyl phosphinic acid.

The compositions of the invention can also contain at least one unsaturated polyester resin. Such resin esters are derived from polycarboxylic acids and polyhydric alcohols, preferably dicarboxylic acids and dihydric alcohols, with at least one of the acid and alcohol components being unsaturated. Preferably, the unsaturated polyester resin component will contain a relatively large number of double bonds and be derived from short chain aliphatic polyhydric polyols, such as ethylene glycol and 1,3-propylene glycol, and short chain unsaturated polybasic acids, such as fumaric acid and maleic acid. Such resins can contain quantities of longer chain polyols such as 1,6-hexanediol, as well as higher polybasic acids, such as adipic acid and phthalic acid.

Still further, the compositions of the invention can optionally contain at least one polyvinyl alkyl ether. Polyvinyl alkyl ethers are well known in the art. Such ethers will preferably contain 1–8, more preferably 1–4, carbon atoms in the alkyl moiety of the ether.

The compositions of the invention can also include a pre-formed polymeric component (in addition to the polymeric materials listed above) having an intrinsic viscosity of 0.1 to 1.3 that are obtained by the polymerization of at least one (meth)acrylic, styrene, substituted (meth)acrylic and non-acrylic olefinic monomers. Exemplary additional pre-formed polymeric materials include poly(methyl methacrylate/n-butylacrylate/ethyl acrylate) (90/5/5); poly (n-butyl methacrylate/isobutyl methacrylate) (50/50); poly (n-butyl methacrylate) and poly (ethyl methacrylate).

The preferred composition can optionally include an epoxy component that can be any monomeric or polymeric compound or mixture of compounds having an average of greater than one 1,2-epoxy groups per molecule. The polymeric epoxide materials can have a number-average molecular weight of 300 to 10,000. Useful epoxy compounds are well-known and include the polyglycidyl ethers of polyhydric alcohols such as ethylene glycol, triethylene glycol, 1,2-propylene glycol, 1,5-pentanediol, 1,2,6-hexanetriol, glycerol and 2,2-bis(4-hydroxy-cyclohexyl)propane; the polyglycidyl esters of aliphatic or aromatic polycarboxylic acids such as oxalic acid, succinic acid, glutaric acid, terephthalic acid, 2,6-naphthalene dicarboxylic acid and dimerized linolenic acid; the polyglycidyl ethers of polyphenols such as bisphenol A, 1,1-bis(4-hydroxyphenyl)ethane, 1,1-bis(hydroxyphenyl)isobutane, 2,2-bis(4-hydroxy-t-butylphenyl)propane, 1,5-dihydroxynaphthalene and novolak resins; and cycloaliphatic polyglycidyl compounds.

Another optional component is up to 1 percent by weight of a waxy substance selected from the group consisting of paraffin wax, beeswax, ceresin wax and spermaceti wax.

The environmental resistance of an adhesive system made from the composition of the invention can be improved by the optional addition of a mixture of a metal molybdate such as zinc molybdate, calcium molybdate, barium molybdate and/or strontium molybdate and an inert filler such as zinc phosphate, calcium phosphate, magnesium phosphate and/or calcium carbonate. Such mixtures are more fully described in U.S. Pat. No. 4,017,315.

The compositions can also optionally include polybasic lead salts of phosphorus acid and saturated and unsaturated organic dicarboxylic acids and acid anhydrides, particularly dibasic lead phthalate, monohydrous tribasic lead maleate, tetrabasic lead fumarate, dibasic lead phosphite and mixtures thereof; and zinc oxide. These compounds can be effective in improving environmental resistance.

The room temperature-reactive initiator systems that may be employed are well-known redox couple systems. Basically, such systems comprise at least one oxidizing agent and at least one reducing agent that are co-reactive at room temperature to generate free radicals effective to initiate addition polymerization reactions and cure the adhesive.

The oxidizing agent (also known as free radical generator) should be a peroxide. Representative peroxides include, without limitation, organic peroxides, such as benzoyl peroxide, dicumyl peroxide and other diacyl peroxides, hydroperoxides such as cumene hydroperoxide and tertiary butyl hydroperoxide, peresters such as β-butylperoxybenzoate and tertiary butyl peroxide acetate, and ketone hydroperoxides such as methyl ethyl ketone hydroperoxide.

Representative reducing agents (also known as accelerators) include, without limitation, sulfinic acids; alpha-aminosulfones such as bis(tolysulfonmethyl)-benzyl amine; tertiary amines such as diisopropyl-p-toluidine, dimethyl aniline, dialkyl-p-halogenated aniline and dimethyl-p-toluidine; and aminealdehyde condensation products, for example, the condensation products of aliphatic aldehydes such as butyraldehyde with primary amines such as aniline or butylamine. The use of known promoters (such as an organic salt of a transition metal, such as cobalt, nickel, manganese or iron naphthenate, copper octoate, copper acetylacetonate, iron hexoate or iron propionate) with the redox couple initiator systems can be advantageous. Preferably, the amount of reducing agent is in the range from about 0.05 to about 10, preferably about 0.1 to about 6, percent by weight of the first part.

The second part of the composition can include a bonding activator that includes the peroxide oxidizing agent for the redox catalyst system. The bonding activator can include (1) from about 0.5 to about 50 percent by weight, based on total weight of bonding activator, of at least one peroxide oxidizing agent which can function as an oxidant of a redox couple initiator system; and (2) from about 30 to about 99.5 percent by weight, based on total weight of bonding activator, of a carrier vehicle. In addition, the bonding activator also can contain either the epoxy component or the phosphorus-containing compound.

The carrier vehicles that are suitable for use in the bonding activators can be a simple inert solvent or diluent such as methylene chloride, or butyl benzyl phthalate, including mixtures of such solvents or diluents. The carrier vehicle should contain no more than 5% by weight of any moiety that is reactive with the oxidizing agent at room temperature. The carrier vehicle can be a more complex mixture including at least one film-forming binder in addition to inert solvent or diluent. In this case, the film-forming binder is preferably substantially inert with respect to the oxidant that is present in the accelerator composition. Among the polymeric film-forming binder materials that can be employed in the carrier vehicle are, without limitation, polyalkylacrylates and methacrylates and copolymers thereof, polystyrene and copolymers thereof, vinyl polymers and copolymers, polyesters, polyketones, polysulfones, phenolic resins, polyvinyl butyrals and polycarbonates. The carrier vehicle can contain, in addition to solvent or solvent and film-forming binder, additives such as external plasticizers, flexibilizers, suspenders and stabilizers, providing that any such additives do not unacceptably adversely affect the stability of the activator composition.

Another optional component is a tertiary amine represented by the structure

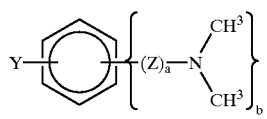

wherein Z is methylene; Y is selected from the group consisting of hydrogen, hydroxy, amino, halogen, alkyl having 1 to 8, preferably 1 to 4, carbon atoms, and alkoxy having 1 to 8, preferably 1 to 4, carbon atoms; a is 0 or 1; and b is 1 or 2.

This tertiary amine is advantageous in accelerating the cure of such compositions containing the unsaturated organophosphorus compounds. Especially preferred tertiary amines are N,N-dimethyl aniline and N,N-dimethylaminomethylphenol.

The components of the composition are mixed together by means well known in the art. The catalyst, of course, is not activated until curing of the composition is desired.

The adhesive systems preferably are provided as multi-pack adhesive systems where one package contains a portion of the polymerizable component and the reducing agent and a second package contains the other portion of the polymerizable component and the bonding activator, with the two packages being mixed at the time of use.

It is necessary that the epoxy compound when incorporated into the adhesives be kept separate from compounds having acidic moieties, such as the phosphorus-containing compound and methacrylic acid to inhibit premature reaction between these components. Thus, in such cases, prior to using the compositions, one package will contain the phosphorus-containing compound and the other package will contain the epoxy component. Preferably, the epoxy component will be incorporated into the bonding activator that contains the oxidizing agent of the redox couple initiator system, with the phosphorus-containing compound being incorporated into the package containing the polymerizable component. While other multipack systems are available, e.g., the bonding activator can contain the reducing agent of the redox couple catalyst system and the epoxy resin with the oxidizing agent and polymerization inhibitors being incorporated into the package containing the polymerizable adhesive mass, they are less preferable with respect to shelf stability. After mixing the individual packages, one or both surfaces to be joined are coated with the mixed adhesive system and the surfaces are placed in contact with each other.

Generally, the composition systems include the first and second parts in conventional amounts, for example, in a volume ratio of about 24:1 to about 1:1, preferably about 10:1 to about 1:1, most preferably 1:1, first part: second part.

As mentioned above, compositions that include the trifunctional olefinic monomer preferably have a flash point less than 141° F. In the case of benzylidenecyanoacetates, the flash point preferably is 130 to 150° F.

The adhesive systems may be used to bond together any types of substrate surfaces. The adhesive is particularly useful for bonding metal surfaces, such as steel, aluminum and copper, to a variety of substrates, including metal, plastics, and other polymers, reinforced plastics, fibers, glass, ceramics, wood and the like. It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing. The copolymer system of the invention is especially useful in the formulation of a structural adhesive used in the bonding of lightweight metal and plastic materials in the fabrication, repair and reconstruction of transportation vehicle bodies and component parts. The copolymerization system of the invention also is useful in formulating coatings and primers for metals and plastics.

The invention is described in more detail by way of the following non-limiting examples.

EXAMPLE 1

A mixture of 80.90 g benzaldehyde, 64.10 g 2-cyanoacetamide, 58.00 g toluene, 0.73 g piperidine and 0.80 g acetic acid was heated in a 140° C. oil bath. After three hours the reaction was complete as indicated by methanol evolution. The product was recrystallized from ethanol resulting in a compound A having a structure represented below.

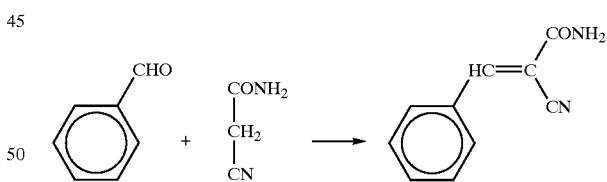

Compound A was a solid having a melting temperature of 118–120° C. and was poorly soluble in common solvents. Copolymerization of compound A with vinyl toluene (on a 1:1 mole ratio) was demonstrated in dimethyl formamide solution (50% concentration), initiated by 1 weight % of benzoyl peroxide (based on the amount of the combined monomers).

EXAMPLE 2

A mixture of 59.57 g benzaldehyde, 85.43 g 1-cyanoacetylpiperidine, 58.01 g toluene, 0.73 g piperidine and 0.76 g acetic acid was heated in a 140° C. oil bath for three hours to provide a compound B having a structure represented below

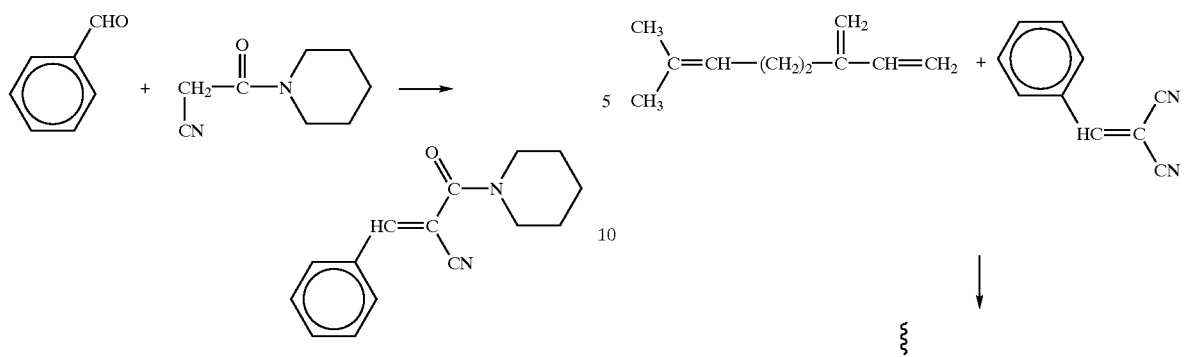

Compound B was a viscous liquid. Copolymerization of compound B with vinyl toluene (on a 1:1 mole ratio) was demonstrated in chlorobenzene solution, initiated by 1 weight % of benzoyl peroxide (based on the weight of the combined monomers).

EXAMPLE 3

A mixture of 36.37 g benzaldehyde, 40.82 g methanesulfonyl acetonitrile, 40.31 g absolute ethanol and 0.20 g piperidine was heated for four hours in a 120° C. oil bath to provide a compound C having a structure represented below

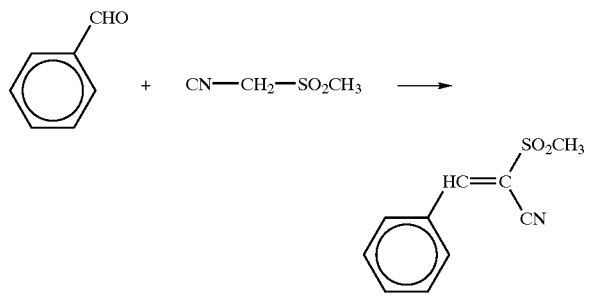

Compound C was a solid with a melting range of 131–132° C. and was poorly soluble in common solvents. Copolymerization of compound C with vinyl toluene (on a 1:1 mole ratio) was demonstrated in dimethyl formamide solution (50% concentration), initiated by 1 weight % of benzoyl peroxide (based on the weight of the combined monomers).

EXAMPLE 4

A copolymer was made by heating a mixture of 70.37 g myrcene, 79.65 g benzylidenemalononitrile (to provide a 1:1 mole ratio) and 0.758 g benzoyl peroxide in 75.00 g chlorobenzene solution at 60° C. The resulting copolymer has a structure represented by

EXAMPLE 5

A two-part reactive adhesive system with ±1-methoxy-2-propyl benzylidenecyanoacetate, vinyl toluene, divinyl benzene, diethyl fumarate and monoethyl fumarate as co-monomers/reactive diluents was formulated as indicated below in weight percent. The ±1-methoxy-2-propyl benzylidenecyanoacetate was synthesized by mixing 261.72 g benzaldehyde, 387.62 g 2-methoxy-1-methylethyl cyanoacetate, 256.12 g absolute alcohol, 3.83 g piperidine and 2.28 g acetic acid and heating the mixture in a 140° C. oil bath for 3.5 hours. This adhesive utilizes chlorosulfonated polyethylene/cumyl hydroperoxide/VANAX 808/Copper(II) as the redox initiator system.

| A-side | |
|---|---|
| 40% chlorosufonated polyethylene in vinyl toluene | 80.00 |
| Divinyl benzene | 8.00 |
| ±1-Methoxy-2-propyl benzylidenecyanoacetate | 6.00 |
| Silica | 5.00 |
| 80% cumyl hydroperoxide | 1.00 |
| B-side | |
| Polystyrene powder | 45.00 |
| Diethyl fumarate | 40.45 |
| Monoethyl fumarate | 5.00 |
| Silica | 3.00 |
| VANAX 808 accelerator[1] | 6.50 |
| Copper(II) ethylhexanoate | 0.05 |

[1]Condensation product of butyraldehyde and aniline commercially available from R. T. Vanderbilt.

The A-side and the B-side were mixed together and the resulting adhesive was applied to five fiber reinforced polyester 1"×4" coupons that were bonded together to form lap shear joints as per ASTM D-5868-95. The lap shear joints were allowed to fully cure overnight and then tested according to ASTM D-5868-95. The joints exhibited an average strength of 182.5 psi and an adhesive failure mode (in other words, the adhesive failed before any tearing of the fiberglass substrate).

EXAMPLE 6

A two-part reactive adhesive system with 2-ethylhexyl benzylidenecyanoacetate, vinyl toluene and divinyl benzene as co-monomers/reactive diluents was formulated as indicated below in weight percent. The 2-ethylhexyl benzylidenecyanoacetate was synthesized by mixing 69.95 g benzaldehyde, 130.04 g 2-ethylhexyl cyanoacetate, 54.63 g absolute ethanol and five drops of piperizine and then heating the mixture in a 100° C. oil bath for 4–6 hours.

| Side A | |
|---|---|
| Polystyrene | 30.8 |
| Vinyl toluene | 30.8 |
| Methacrylated acrylonitrile-butadiene rubber | 25.0 |
| Divinyl benzene | 4.0 |
| Hydroxyethyl methacrylate phosphate | 3.0 |
| Silica | 2.0 |
| N,N-Diisopropanol-p-toluidine | 1.3 |
| N,N-Dimethylaniline | 0.6 |
| Side B | |
| Benzoyl peroxide dispersion | 7.0 |
| 0.2 mm glass beads | 20.0 |
| Silica | 2.0 |
| Calcium carbonate | 29.0 |
| 2-ethylhexyl benzylidenecyanoacetate | 42.0 |

Side A was mixed with side B in a 2:1 volume ratio and the resulting adhesive was applied to steel coupons that were then bonded into lap shear joints with ½ inch overlaps. Testing was performed according to ASTM D-1002-94 and the joints had an average adhesive strength of 1633 psi. Sides A and B were stored separately in a 35° C. oven for 20 days. After storage, side A was mixed with side B in a 2:1 volume ratio and lap shear joints were bonded and tested as described above. There was no reduction in strength indicating that the 2-ethylhexyl benzylidenecyanoacetate was stable in the presence of the benzoyl peroxide.

EXAMPLE 7

A two part reactive adhesive was made with methyl 1,1-dicyano-2-carboxyethene and vinyl toluene as co-monomers. 42.75 weight of methyl 1,1-dicyano-2-carboxyethene, 42.75 weight percent vinyl toluene, 1.40 weight percent diisopropanol-p-toluidine, 0.60 weight percent dimethyl aniline and 5.00 weight percent silica were mixed together to form side A. 7.50 weight percent benzoyl peroxide initiator then was mixed with side A and immediately thereafter the resulting adhesive was applied to five fiber reinforced polyester 1"×4" coupons that were bonded together to form lap shear joints as per ASTM D-5868-95. The lap shear joints were allowed to fully cure overnight and then tested according to ASTM D-5868-95. The joints exhibited an average strength of 9 psi and an adhesive failure mode. Weight percents are based on the total amount of sides A and B.

EXAMPLE 8

A two part reactive adhesive was made with methyl 1,1-dicyano-2-carboxyethene and vinyl toluene as co-monomers. 42.75 weight of dimethylcyanofumarate, 42.75 weight percent vinyl toluene, 1.40 weight percent diisopropanol-p-toluidine, 0.60 weight percent dimethyl aniline and 5.00 weight percent silica were mixed together to form side A. 7.50 weight percent benzoyl peroxide initiator then was mixed with side A and immediately thereafter the resulting adhesive was applied to five fiber reinforced polyester 1"×4" coupons that were bonded together to form lap shear joints as per ASTM D-5868-95. The lap shear joints were allowed to fully cure overnight and then tested according to ASTM D-5868-95. The joints exhibited an average strength of 274 psi and an adhesive failure mode. Weight percents are based on the total amount of sides A and B.

EXAMPLE 9

A two-part reactive adhesive system with ±2-octyl benzylidinecyanoacetate, vinyl toluene and divinyl benzene as co-monomers/reactive diluents was formulated as indicated below in weight percent. The ±2-octyl benzylidinecyanoacetate was synthesized by mixing 52.77 g 2-octanol, 72.23 g ±2-octyl benzylidinecyanoacetate, 75.01 g cyclohexane and 0.10 g titanium(IV) butoxide and then heating the mixture in a 140° C. oil bath for 28 hours.

| Side A | |
|---|---|
| 50% polystyrene in vinyl toluene | 54.12 |
| ±2-octyl benzylidinecyanoacetate | 8.70 |
| Methacrylated acrylonitrile-butadiene rubber | 23.35 |
| Divinyl benzene | 3.96 |
| KAYAMER PM-21[1] | 2.86 |
| Silica | 4.13 |
| N,N-Diisopropanol-p-toluidine | 1.20 |
| N,N-Dimethylaniline | 0.64 |
| Spermaceti wax | 1.00 |
| Methyl ether of hydroquinone | 0.04 |

[1]Phosphate ester of 6-hydroxyhexanoyloxyethyl acrylate commercially available from Nippon Kayaku Co. Ltd.

| Side B | |
|---|---|
| Benzoyl peroxide dispersion | 9.25 |
| Epoxy resin[1] | 40.35 |
| Silica | 3.0 |
| Calcium carbonate | 40.65 |
| Epoxy-functional rubber[2] | 6.75 |

[1]Bisphenol A epoxy commercially available from Ciba-Geigy under the trade designation ARALDITE GY-6010
[2]Commerically available from Rhone-Poulenc under the trade designation EPI-REZ 58006

Side A was mixed with side B in a 2:1 volume ratio and the resulting adhesive was applied to steel coupons that were then bonded into lap shear joints with ½ inch overlaps. Testing was performed according to ASTM D-1002-94 and the joints had an average adhesive strength of 1504 psi. Another batch of adhesive was prepared and applied to fiber reinforced polyester 1"×4" coupons that were bonded together to form lap shear joints as per ASTM D-5868-95. The lap shear joints were allowed to fully cure overnight and then tested according to ASTM D-5868-95. The joints exhibited an average strength of 199 psi.

EXAMPLE 10

An adhesive was made the same as in Example 9 except that ethyl benzylidenecyanoacetate was substituted for 2-octyl benzylidenecyanoacetate. Side A was mixed with side B in a 2:1 volume ratio and the resulting adhesive was applied to steel coupons that were then bonded into lap shear joints with ½ inch overlaps. Testing was performed according to ASTM D-1002-94 and the joints had an average adhesive strength of 1657 psi. Another batch of adhesive was prepared and applied to fiber reinforced polyester 1"×4" coupons that were bonded together to form lap shear joints as per ASTM D-5868-95. The lap shear joints were allowed to fully cure overnight and then tested according to ASTM D-5868-95. The joints exhibited an average strength of 153 psi.

What is claimed is:

1. A bonded assembly that includes a first substrate, a second substrate and an adhesive composition between the first and second substrates wherein the adhesive composition is the cured product of a reaction mixture comprising (a) a trifunctional olefinic first monomer comprising an olefinic group that has at least three functional groups each bonded directly to the unsaturated carbon atoms of said olefinic group, (b) an olefinic second monomer that is copolymerizable with the first monomer and (c) a free radical initiator.

2. A method for bonding together two substrates comprising:
   (A) applying to a first substrate a composition resulting from a mixture of (a) a trifunctional olefinic first monomer comprising an olefinic group that has at least three functional groups each bonded directly to the unsaturated carbon atoms of said olefinic group, (b) an olefinic second monomer that is copolymerizable with the first monomer and (c) a free radical initiator and then
   (B) contacting a second substrate to the composition-applied first substrate so that the first and second substrate adhesively bond together.

3. A method according to claim 2 wherein the trifunctional olefinic monomer comprises a benzylidenecyanoacetate.

4. A method according to claim 3 wherein the benzylidenecyanoacetate has a structure represented by $$\text{CH}=\text{C} \begin{array}{c} \text{CN} \\ \text{C}-\text{O}-\text{CH} \\ \text{O} \end{array} \begin{array}{c} R^4 \\ R^5 \end{array}$$

wherein each of $R^4$ and $R^5$ is the same or different and is selected from alkyl, alkoxy or alkyl ether.

5. A method according to claim 3 wherein the olefinic second monomer comprises a styrenic monomer.

6. A method according to claim 5 wherein the free radical initiator comprises a room temperature-active redox system.

7. A method according to claim 2 wherein the trifunctional first monomer has a structure represented by $$\begin{array}{c} Y \\ \diagdown \\ Z \end{array} C = C \begin{array}{c} X \\ \diagup \\ X \end{array}$$

wherein each X is the same or different and is an electron withdrawing group; Y is —$R^1$, —Ar or an electron withdrawing group; and Z is a moiety selected from the first or second row elements of the Periodic Chart in the form of either a single element or linearly bonded multiple elements, wherein $R^1$ is alkyl, alkoxy, alkyl ether, amino, alkylamino, alkylamino, or alkylamimidoyl; and Ar is an aryl group.

8. A method according to claim 1 wherein the electron withdrawing group is —$SO_2R^1$, —CN, $SO_2$Ar, —(C=O)$R^2$, or halogen, wherein $R^1$ is alkyl, alkoxy, alkyl ether, amino, alkylamino, alkylamino, or alkylamimidoyl; Ar is an aryl group; and $R^2$ is $R^1$, —$OR^1$, —N(H)$R^1$, or —$NH_2$.

9. A method according to claim 8 wherein X is —CN or —$COOR^1$; Y is —CN, —$COOR^1$ or —Ar; Z is hydrogen; and $R^1$ is a primary or secondary linear or branched alkyl having 1 to 18 carbon atoms.

10. A method according to claim 8 wherein the olefinic second monomer is selected from styrenic monomer, vinyl ether, vinyl acetate, n-vinylcarbazole or diene monomer.

11. A method according to claim 2 wherein the trifunctional olefinic monomer is liquid at room temperature.

12. A method according to claim 1 wherein the olefinic second monomer has a structure represented by $$(R^6)_2C = \begin{array}{c} CR^6 \\ | \\ A \end{array}$$

wherein A is aryl, substituted aryl, alkyl, alkenyl, alkoxy, alkenyloxy, alkadienyl or acetoxy and each $R^6$ is the same or different and is selected from hydrogen or alkyl.

13. A method according to claim 12 wherein A is aryl or substituted aryl and $R^6$ is hydrogen.

14. A method according to claim 13 wherein the olefinic second monomer comprises a styrenic monomer.

15. A method according to claim 14 wherein the olefinic second monomer comprises vinyl toluene.

16. A method according to claim 12 wherein the olefinic second monomer is selected from styrenic monomer, vinyl ether, vinyl ester, n-vinylcarbazole or diene monomer.

17. A method according to claim 2 wherein an olefinic third co-monomer is included in the composition mixture.

18. A method according to claim 17 wherein the olefinic third co-monomer is selected from a maleate ester or a fumarate ester.

19. A method according to claim 2 wherein the free radical initiator comprises a room temperature-active redox system.

20. A method for providing a coating on a substrate comprising applying to the substrate a composition resulting from a mixture of (a) a trifunctional olefinic first monomer, (b) an olefinic second monomer that is copolymerizable with the first monomer and (c) a free radical initiator wherein said trifunctional olefinic first monomer contains at least three functional groups that are each bonded directly to the unsaturated carbon atoms.

21. A method according to claim 20 wherein the trifunctional first monomer has a structure represented by $$\begin{array}{c} Y \\ \diagdown \\ Z \end{array} C = C \begin{array}{c} X \\ \diagup \\ X \end{array}$$

wherein each X is the same or different and is an electron withdrawing group; Y is —$R^1$, —Ar or an electron withdrawing group; and Z is a moiety selected from the first or second row elements of the Periodic Chart in the form of either a single element or linearly bonded multiple elements, wherein $R^1$ is alkyl, alkoxy, alkyl ether, amino, alkylamino, alkylamino, or alkylamimidoyl; and Ar is an aryl group.

22. A method according to claim 20 wherein the olefinic second monomer is selected from styrenic monomer, vinyl ether, vinyl ester, n-vinylcarbazole or diene monomer.

23. A method according to claim 20 wherein the trifunctional olefinic monomer comprises a benzylidenecyanoacetate and the olefinic second monomer comprises a styrenic monomer.

24. An adhesive composition comprising:
   (a) a trifunctional olefinic first monomer comprising an olefinic group that has at least three functional groups each bonded directly to the unsaturated carbon atoms of said olefinic group;
(b) an olefinic second monomer that is copolymerizable with the first monomer;
(c) a redox initiator system, and
(d) a reactive diluent, wherein the composition is a liquid at room temperature is 100% reactive and substantially free of volatile organic solvent, and is curable at room temperature.

25. A composition according to claim 24 wherein the trifunctional first monomer has a structure represented by

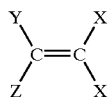

wherein each X is the same or different and is an electron withdrawing group; Y is —$R^1$, —Ar or an electron withdrawing group; and Z is a moiety selected from the first or second row elements of the Periodic Chart in the form of either a single element or linearly bonded multiple elements, wherein $R^1$ is alkyl, alkoxy, alkyl ether, amino, alkylamino, alkylamino, or alkylamimidoyl; and Ar is an aryl group.

26. A composition according to claim 25 wherein the electron withdrawing group is —$SO_2R^1$, —CN, $SO_2Ar$, —(C=O)$R^2$, or halogen, wherein $R^1$ is alkyl, alkoxy, alkyl ether, amino, alkylamino, alkylamino, or alkylamimidoyl; Ar is an aryl group; and $R^2$ is $R^1$, —$OR^1$, —$N(H)R^1$, or —$NH_2$.

27. A composition according to claim 26 wherein X is —CN or —$COOR^1$; Y is —CN, —$COOR^1$ or —Ar; Z is hydrogen; and $R^1$ is a primary or secondary linear or branched alkyl having 1 to 18 carbon atoms.

28. A composition according to claim 26 wherein the olefinic second monomer comprises a styrenic monomer.

29. A composition according to claim 24 wherein the trifunctional olefinic monomer comprises a benzylidenecyanoacetate.

30. A composition according to claim 29 wherein the benzylidenecyanoacetate has a structure represented

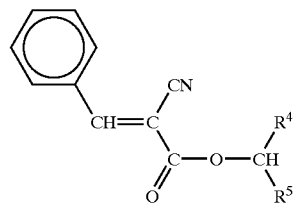

wherein each of $R^4$ and $R^5$ is the same or different and is selected from alkyl, alkoxy or alkyl ether.

31. A composition according to claim 29 wherein the olefinic second monomer comprises a styrenic monomer.

32. A composition according to claim 24 wherein the olefinic second monomer has a structure represented by

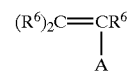

wherein A is aryl, substituted aryl, alkyl, alkenyl, alkoxy, alkenyloxy, alkadienyl or acetoxy and each $R^6$ is the same or different and is selected from hydrogen or alkyl.

33. A composition according to claim 32 wherein A is aryl or substituted aryl and $R^6$ is hydrogen.

34. A composition according to claim 33 wherein the olefinic second monomer comprises a styrenic monomer.

35. A composition according to claim 34 wherein the olefinic second monomer comprises vinyl toluene.

36. A composition according to claim 24 further comprising an olefinic third co-monomer.

37. A composition according to claim 36 wherein the olefinic third co-monomer is selected from maleate ester or fumarate ester.

38. A composition according to claim 24 having a flash point greater than 141° F.

39. A two part, room temperature-curable, liquid composition comprising:

a first part including
    (a) a second olefinic monomer; and
    (b) a reducing agent that is interactive with a peroxide oxidizing agent; and
a second part including
    (a) a trifunctional olefinic monomer comprising an olefinic group that has at least three functional groups each bonded directly to the unsaturated carbon atoms of said olefinic group; and
    (b) a peroxide oxidizing agent.

40. A composition according to claim 39 wherein the first part and the second part are mixed together in a volume ratio of 1:1.

* * * * *